United States Patent [19]

Stahl et al.

[11] Patent Number: 4,594,374

[45] Date of Patent: Jun. 10, 1986

[54] PROCESS FOR THE PRODUCTION OF AQUEOUS DISPERSIONS AND USE THEREOF FOR THE PRODUCTION OF METAL EFFECT LACQUER COATINGS

[75] Inventors: Hans-Georg Stahl, Oldenburg; Jürgen Schwindt, Leverkusen; Klaus Nachtkamp, Cologne, all of Fed. Rep. of Germany

[73] Assignee: Bayer Aktiengesellschaft, Leverkusen, Fed. Rep. of Germany

[21] Appl. No.: 706,672

[22] Filed: Feb. 28, 1985

[30] Foreign Application Priority Data

Mar. 13, 1984 [DE] Fed. Rep. of Germany ....... 3409080

[51] Int. Cl.$^4$ .......................... C09D 3/52; C09D 3/72
[52] U.S. Cl. .................... 523/501; 427/205; 524/507; 524/512; 524/513
[58] Field of Search ................. 523/501, 505; 524/501, 524/513, 507, 512; 427/205

[56] References Cited

U.S. PATENT DOCUMENTS

| | | | |
|---|---|---|---|
| 4,102,691 | 7/1978 | Walters et al. | 427/205 |
| 4,115,338 | 9/1978 | Kobayashi et al. | 523/505 |
| 4,156,667 | 5/1979 | Turpin | 523/501 |
| 4,265,929 | 5/1981 | Wagner et al. | 427/205 |
| 4,323,600 | 4/1982 | Sakata et al. | 427/205 |
| 4,436,849 | 3/1984 | Aihara et al. | 523/501 |
| 4,459,379 | 7/1984 | Schwarz | 523/501 |
| 4,510,275 | 4/1985 | Ihikura et al. | 524/513 |
| 4,518,724 | 5/1985 | Kuwajima et al. | 523/501 |

FOREIGN PATENT DOCUMENTS

| | | | |
|---|---|---|---|
| 38127 | 10/1981 | European Pat. Off. | 427/205 |
| 69936 | 1/1983 | European Pat. Off. | 427/205 |

*Primary Examiner*—Ronald W. Griffin
*Attorney, Agent, or Firm*—Connolly and Hutz

[57] ABSTRACT

Aqueous dispersions based on selected polyesters and-/or acrylate resins, water-soluble aminoplast resins, emulsifiers, aluminium bronze, organic solvents and optionally further auxiliaries are suitable for the production of metal effect lacquer coatings by the two-layer wet-in-wet lacquering process.

2 Claims, No Drawings

PROCESS FOR THE PRODUCTION OF AQUEOUS DISPERSIONS AND USE THEREOF FOR THE PRODUCTION OF METAL EFFECT LACQUER COATINGS

This invention relates to a process for the production of aqueous dispersions based on a polyester, alkyd resin or polyacrylate resin dispersion and aluminium bronze and to the use of such dispersions for the production of metal effect lacquer coatings.

Metal effect lacquer coatings enjoy great popularity especially with the purchasers of automobiles. The two-layer wet-in-wet lacquering process is preferably used for coating; firstly, a pigmented aluminium bronze-containing base lacquer is sprayed on, which, after a short period of intermediate exposure to air, without interim stoving, is covered by a clear lacquer. Both layers are subsequently stoved together. This two-layer lacquering process combines reliable production with the high commercial quality of the lacquer coatings obtained. With regard to environmental protection and the cost of raw materials, it is preferable to use the lacquers in the form of aqueous dispersions.

The fundamental problem of metal effect two-layer lacquering when using aqueous dispersions is the reduced adhesion of the clear lacquer to the base lacquer and the production of a non-uniform metal effect.

Furthermore, it should be noted that only those measures which may be implemented without too high shearing energy are feasible as the lamella-shaped aluminium bronze particles would otherwise be destroyed and the metal effect obtainable would suffer.

Aqueous base lacquers or metal effect two-layer lacquering are known from European Patent Application No. 38 127, which are based on a partially cross-linked polymeric microgel, which has a pseudoplastic or thixotropic character. European Patent Application No. 69 936 relates to a process for the production of aqueous dispersions which may be used as base lacquers for metal effect two-layer coatings, unsaturated compounds being polymerised in the presence of cellulose ester. However, neither of these applications solve the above-mentioned problem.

This object has surprisingly been achieved by a process in which pigment, aluminium bronze and an emulsifier are added to a binder dispersion. A directly-applicable aqueous metal effect base lacquer for two-layer lacquering is obtained in this manner. Base lacquer coatings produced therefrom have excellent interface adhesion to the clear lacquer and a metal effect which is maintained in a trouble-free manner during the wet-in-wet application of the clear lacquer.

Thus, the present invention relates to a process for the production of an aqueous metal effect base lacquer, based on:

(A) from 10 to 30 parts, by weight, oil-free polyester, alkyd resin and/or polyacrylate resin;
(B) from 2.5 to 15 parts, by weight, water-soluble aminoplast resin;
(C) from 2 to 10 parts, by weight, aluminium bronze;
(D) from 0.1 to 10 parts, by weight, non-ionic emulsifier;
(E) organic solvent; and, optionally,
(F) further auxiliaries;

characterised in that a resin having a maximum acid number of 30 and a maximum hydroxyl number of 150 is used as component (A) and this is mixed with the other components in the form of an aqueous dispersion having a solids content of from 30 to 50%, by weight.

A further object of the present invention is the use of dispersions produced in this manner for the production of metal effect two-layer lacquer coatings.

Preferred oil-free polyester and alkyd resins (A) have an average functionality per molecule of from 2.5 to 10, an average degree of condensation per molecule of from 10 to 25, (the degree of condensation being the total of the monomer units in the chain of the polymer molecule), an average urethane group content per molecule of from 3 to 6, and contain radicals of condensed 2,2-di(-hydroxymethyl)carboxylic acids and/or hydroxypivalic acid corresponding to an acid number of from 15 to 30, up to at least 80% of which are neutralized.

For the present purposes, the term "alkyd resins" is to be understood as designating fatty acid-, oil- and isocyanate-modified polyesters.

Aliphatic, cycloaliphatic saturated or unsaturated and/or aromatic polybasic carboxylic acids, preferably di-, tri- and tetra-carboxylic acids, having from 2 to 14, preferably from 4 to 12, carbon atoms per molecule or derivatives thereof which are capable of esterifying (for example anhydrides or esters), such as phthalic acid anhydride, isophthalic acid, terephthalic acid, tetrahydro- and hexahydro-phthalic acid anhydride, endomethylene-tetrahydrophthalic acid, succinic acid, glutaric acid, sebacic acid, azelaic acid, trimellitic acid and trimellitic acid anhydride, pyromellitic acid anhydride, fumaric acid and maleic acid are preferred acid components for the synthesis of the polyesters or alkyd resins (A). Phthalic acid anhydride is the acid component most often used. The polyesters or alkyd resins (A) should not contain more than 20 mol%, based on the polycarboxylic acid radicals condensed therein, of fumaric and maleic acid radicals.

Aliphatic, cycloaliphatic and/or araliphatic alcohols having from 1 to 15, preferably from 2 to 6, carbon atoms, and from 1 to 6, preferably from 1 to 4, OH groups bound to non-aromatic carbon atoms per molecule, for example glycols, such as ethylene glycol, propane diol-1,2 and -1,3, butane diol-1,2, -1,3, and 1-4, 2-ethyl-propane diol-1,3, 2-ethyl-hexane diol-1,3, neopentylglycol, 2,2-trimethyl-pentane diol-1,3, hexane diol-1,6, cyclohexane diol-1,2 and -1,4, 1,2- and 1,4-bis-(hydroxy-methyl)-cyclohexane, adipic acid-bis-(ethylene glycol ester); ether alcohols, such as di- and triethylene glycol, dipropylene glycol; dimethylol propionic acid, oxalkylated bisphenols having two $C_2$ or $C_3$ oxalkyl groups per molecule, perhydrogenated bisphenols; butane triol-1,2,4, hexane triol-1,2,6, trimethylolethane, trimethylolpropane, trimethylolhexane, glycerin, pentaerythritol, dipentaerythritol, mannitol and sorbitol; chain-terminating monohydric alcohols having from 1 to 8 carbon atoms, such as propanol, butanol, cyclohexanol and benzyl alcohol, and hydroxypivalic acid are preferred alcohols for the synthesis of the polyesters or alkyd resins (A). Glycerin, trimethylolpropane, neopentylglycol and pentaerythritol are the alcohols most often used.

Aliphatic or cycloaliphatic, saturated or unsaturated and/or aromatic monocarboxylic acids having from 3 to 24 carbon atoms per molecule, such as benzoic acid, p-t-butyl benzoic acid, toluic acid, hexahydrobenzoic acid, abietic acid and lactic acid, are preferred monocarboxylic acids for the production of the polyesters or alkyd resins (A).

The alkyd resins or polyesters (A) may also contain, condensed therein, monohydric alcohols, such as methanol, propanol, cyclohexanol, 2-ethyl-hexanol and benzyl alcohol, in a quantity of up to 15%, by weight, based on alkyd resin or polyester (A). It is also possible to substitute up to 25% of the ester bonds by urethane bonds.

In the alkyd resins (A), the oil length, calculated as triglyceride and based on the alkyd resin, is generally from 5 to 50%, preferably from 20 to 40%, by weight. The drying or non-drying fatty acids, which generally contain from 6 to 24 carbon atoms, may either be used as such or in the form of the glycerin esters, (triglycerides) thereof.

Vegetable and animal oils, fats or fatty acids are preferred, such as coconut oil, peanut oil, castor oil, tung oil, olive oil, soya bean oil, linseed oil, cotton seed oil, safflower oil or -oil fatty acid, dehydrated castor oil or -fatty acid, simple unsaturated fatty acids, lard, tallow and fish oils, tall oil fatty acid and synthetic fatty acids, which may be produced by conjugation or isomerisation formnatural unsaturated oils or fatty acids. The following are examples of preferred saturated fatty acids: coconut oil fatty acids, α-ethyl caproic acid, isononic acid (3,4,4-trimethyl caproic acid) and palmitic acid and stearic acid and synthetic saturated branched fatty acids.

The molecular weight of the polyesters or alkyd resins (A), determined as the numerical average, is from 2000 to 10,000 (molecular weights of up to 5000 are determined by steam pressure osmometry in dioxan and acetone, the lower value being the correct one in the case of differing values; molecular weights of more than 5000 are determined by membrane osmometry in acetone).

Preferred polyacrylate resins (A) are obtained by copolymerising vinyl or vinylidene monomers, such as styrene, α-methyl-styrene, o- or p-chlorostyrene, o-, m- or p-methyl-styrene, p-t-butyl-styrene, (meth)acrylic acid, (meth)acrylonitrile, acrylic and methacrylic acid alkyl ester having from 1 to 8 carbon atoms in the alcohol component, for example ethyl acrylate, methyl acrylate n- or iso-propyl acrylate, n-butyl acrylate, 2-ethylhexyl acrylate, 2-ethyl-hexyl methacrylate, isooctylacrylate, t-butyl acrylate, methyl methacrylate, ethyl methacrylate, n- or iso-propyl methacrylate, butyl methacrylate, isooctyl methacrylate and optionally mixtures thereof; hydroxy-alkyl(meth)acrylates having from 2 to 4 carbon atoms in the alkyl group, such as 2-hydroxy ethyl(meth)acrylate, 2-hydroxy-propyl(meth)acrylate, 4-hydroxybutyl(meth)acrylate, trimethylolpropane-mono(meth)acrylate, pentaerythritol-mono(meth)acrylate and the esters thereof with fatty acids, diesters of fumaric acid, itaconic acid, maleic acid having from 4 to 8 carbon atoms in the alcohol component; acrylonitrile, (meth)acrylic acid amide, vinyl esters of alkane monocarboxylic acids having from 2 to 5 carbon atoms, such as vinyl acetate or vinyl propionate, or mixtures of the above monomers, N-methoxy-methyl(meth)acrylic acid amide.

Preferred monomers include sytrene and (meth)acrylic acid alkyl esters having from 1 to 8 carbon atoms in the alcohol component, the esterification product of fatty acid and hydroxy alkyl acrylates and mixtures thereof.

The polyacrylate resins (A) have average molecular weights $\overline{M}_n$ of from 1000 to 20,000, the molecular weights being determined as described above for the polyesters or alkyd resins (A).

The monomers are essentially incorporated into the copolymer (A) in the same ratios in which they are used for polymerisation, the units polymerised therein being substantially statistically-distributed.

Isocyanates which are preferred for introducing the urethane groups into the polyesters or alkyd resins (I) are polyisocyanates having from 4 to 25, preferably from 4 to 16, carbon atoms and from 2 to 4, preferably 2, isocyanate groups per molecule, that is aliphatic, cycloaliphatic, araliphatic and aromatic diisocyanates as are described, for example, in "Methoden der Organischen Chemie"(Houben-Weyl), Vol. 14/2, 4th edition, Georg Thieme Verlag, Stuttgart 1963, P 61–70, and by W. Siefken, Liebigs Ann. Chem. 562, 75–136, such as 1,2-ethylene diisocyanate, 1,4-tetramethylene diisocyanate, 1,6-hexamethylene diisocyanate, 2,2,4- or 2,4,4-trimethyl-1,6-hexamethylene diisocyanate, 1,12-dodecane diisocyanate, ω, ω'-diisocyanatodipropyl ether, cyclobutane-1,3-diisocyanate, cyclohexane-1,3- and -1,4-diisocyanate, 2,2- and 2,6-diisocyanato-1-methyl-cyclohexane, 3-isocyanatomethyl-3,5,5-trimethylcyclohexyl isocyanate ("isophorone diisocyanate"), 2,5- and 3,5-bis-(isocyanatomethyl)-8-methyl-1,4-methanodecahydronaphthalene, 1,5-, 2,5-, 1,6- and 2,6-bis(isocyanatomethyl)-4,7-methano-hexahydroindane, 1,5- , 2,5-, 1,6- and 2,6-bis-(isocyanato)-4,7-methano-hexahydroindane, dicyclohexyl-2,4'- and -4,4'diisocyanate, 2,4- and 2,6-hexahydrotoluylene diisocyanate, perhydro-2,4' and -4,4'-diphenyl methane diisocyanate, ω, ω'-diisocyanato-1,4-diethyl-benzene, 1,3- and 1,4-phenylene diisocyanate, 4,4'- diisocyanato-diphenyl, 4,4'-diisocyanato-3,3'-dichlorodiphenyl, 4,4'-diisocyanato-3,3'-dimethoxydiphenyl, 4,4'-diisocyanato-3,3'-dimethyl-diphenyl, 4,4'-diisocyanato-3,3'-diphenyl-diphenyl, 2,4'- and 4,4'-diisocyanato-diphenyl methane naphthylene-1,5-diisocyanate, toluylene diisocyanates, such as 2,4- or 2,6-toluylene-diisocyanate, N,N'-(4,4'-dimethyl-3,3'-diisocyanatodiphenyl-)uretdione, m-xylylene-diisocyanate, but also triisocyanates, such as 2,4,4'-triisocyanato-diphenyl ether, 4,4',4''-triisocyanatotriphenyl methane, tris(4-isocyanatophenyl)-thiophosphate, and mixtures of these isomers.

The commercially easily-obtainable aliphatic and cycloaliphatic polyisocyanates, more particularly hexamethylene diisocyanate, 4,4'-di(isocyanatocylcohexyl)methane and 3-isocyanato-methyl-3,5,5-trimethylcyclohexyl isocyanate are generally particularly preferred.

Water-soluble aminoplast resins (B) in relation to the present invention are optionally modified and plasticized urea resins, melamine resins and guanamine and sulphonamide resins. These are, in each case, condensation products of formaldehyde with urea, melamine, guanamine and sulphonamide which are conventionally produced in alkaline medium.

Preferred emulsifiers (D) are described in Ullmann's Encyclopädie der technischen Chemie, 4th edition, vol 10, 449–473, Verlag Chemie, Weinheim 1975, and in McCutcheon's "Detergents & Emulsifiers", McCutcheon Division, Mc Publishing Co., Glen Rock, N.J. (1979).

Preferred non-ionic emulsifiers are compounds corresponding to the following general formulae:

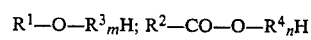

wherein

R$^1$ and R$^2$ independently represent an aliphatic, cycloaliphatic, araliphatic or aromatic group having from 7 to 25 carbon atoms;

R$^3$ and R$^4$ independently represent C$_2$H$_5$O, C$_3$H$_7$O or C$_4$H$_9$O; and m and n independently represent integers of from 3 to 100.

Oligomers and polymers are also usable as emulsifiers or as emulsion-stabilizing materials. These include for example protective colloids, such as casein, partially- and completely-saponified polyvinyl acetate, homo- and co-polymers of vinyl pyrrolidone.

Alkyl-, acyl-, aryl-, alkylaryl-polyglycol ethers which have from 10 to 20 carbon atoms in the alkyl-, acyl-, aryl- or alkylaryl-radical and which are produced by alkoxylating alkanols, carboxylic acids, phenols, or alkyl phenols conventionally used in tenside chemistry with ethylene oxide and/or propylene oxide, are particularly preferred tensides for the production of the emulsifiers (D). These ethylene/propylene oxide mixed ethers may be block-, mixed- or mixed block-adducts conventionally used in tenside chemistry.

The emulsifiers (D) which are most particularly preferred are those emulsifiers which derive from C$_{12}$–C$_{18}$ alkyl- or octyl- or nonyl-phenol-polyethoxylates, which contain an average more than 10 ethylene oxide units, preferably more than 20 ethylene oxide units, per molecule, and mixture thereof.

Preferred organic solvents (E) are those solvents which are water-miscible at room temperature.

Other auxiliaries (F) are, for example, water, flow auxiliaries, thixotropising agents, wax-like materials, such as ethylene copolymers, wetting agents, thickeners, conserving agents and pigments.

The dispersions may in principle be produced by making a paste from components (C) and (E) which is then lacquered on with the alkyl resin dispersion. However, it is generally preferred to produce a mixture of components (A) to (F).

Both methods of production ensure that the aluminium bronze is homogeneously distributed in the individual particles of the dispersed phase.

The two-layer metal effect lacquer coating may be stoved at a temperature of from 80° to 180° C., preferably from 110° to 140° C.

EXAMPLE 1

(a) Composition of the alkyd resin dispersion:
11.88%, by weight, hydrogenated C$_{16}$–C$_{18}$ fatty acids,
7.82%, by weight, trimethylolpropane,
3.32%, by weight, pentaerythritol,
7.57%, by weight, phthalic acid anhydride,
2.48%, by weight, dimethylol propionic acid,
8.31%, by weight, "isophorone diisocyanate",
1.49%, by weight, triethylamine,
5.94%, by weight, N-methyl-pyrrolidone,
0.4%, by weight, polyethylene oxide (started on nonylphenol, on average 20 ethylene oxide units per molecule),
50.79%, by weight, water.

Acid number of the alkyd resin: 26, hydroxy number of the alkyd resin: 144.

(b) Production of the lacquer:
(1) Suspension of 50 g aluminium paste, 65%, by weight, in water (=32.5 g aluminium), in 50 g butyl acetate;

Application of the lacquer, with 144 g alkyd resin dispersion (a) (=67.7 g alkyd resin),
35 g water-soluble melamine resin, 80%, by weight, in water (=28 g melamine resin),
20 g (3-benzyl-4-hydroxyl-biphenyl)-polyglycolether,
15 g water-dilutable polyurethane ("Borchigel L 75) and
130 g water for adjusting the viscosity.

(c) Processing:
The lacquer (b) is applied by a spray gun to a primed and filled piece of bodywork. After exposure to air for 5 minutes, it is covered with a commercial solvent-containing acrylate resin and stoved at 130° C. for 30 min.

(d) Result:
The coating has excellent bronze condition (both in silver-grey or bright metallic).

EXAMPLE 2

(b) Grinding in binder with
4 g aluminium paste, 65%, by weight, in white spirit-/aromatic material mixture (=2.6 g aluminium),
5 g aluminium paste, 65%, by weight, in water (=3.25 g aluminium),
5 g isopropanol,
5 butyl acetate,
1 g (3-benzyl-4-hydroxy-biphenyl)-polyglycol ether,
1 g polypropylene oxide started on sorbitol (functionality 4.3, OH-content 14.5%, by weight, molecular weight about 500),
6 g alkyd resin dispersion 1 (a), 47%, by weight, in water (=2.82 g alkyd resin);

Application of lacquer, with
26 g alkyd resin dispersion 1 (a), 47%, by weight, in water (=12.22 g alkyd resin),
3 g water-dilutable polyurethane ("Borchigel L 75"),
1 g (3-benzyl-4-hydroxy-biphenyl)-polyglycol ether,
1 g polypropylene oxide (see above) started on sorbitol,
5 g water-soluble melamine resin, 80%, by weight, in water (=4 g melamine resin), and
30 g water for adjusting the viscosity.

(c) and (d) as in Example 1.

We claim:

1. Process for the production of an aqueous metal effect-base lacquer based on:
(A) from 10 to 30 parts, by weight, oil-free polyester or alkyd resin having an average functionality per molecule of from 2.5 to 10, an average degree of condensation per molecule of from 10 to 25, an average urethane group content per molecule of from 3 to 6, and containing moietites of condensed 2,2-di(hydroxymethyl)carboxylic acids, hydroxypivalic acid, or both, corresponding to an acid number of from 15 to 30, up to at least 80% of which are neutralized;
(B) from 2.5 to 15 parts, by weight, water-soluble aminoplast resin;
(C) from 2 to 10 parts, by weight, aluminum bronze;
(D) from 0.1 to 10 parts, by weight, non-ionic emulsifier; and
(E) organic solvent;
characterized in that a resin having a maximum acid number of 30 and a maximum hydroxyl number of 150 is used as component (A) and this is mixed with the other components in the form of an aqueous dispersion having a solids content of from 30 to 50%, by weight.

2. The dispersions produced by the process according to claim 1 for the production of metal effect two-layer lacquer coatings.

* * * * *